US008521378B2

United States Patent
Steinhauser et al.

(10) Patent No.: US 8,521,378 B2
(45) Date of Patent: Aug. 27, 2013

(54) METHOD FOR ACTUATING THE NEUTRAL POSITION IN AN AUTOMATIC OR AUTOMATED TRANSMISSION OF A MOTOR VEHICLE, AND CORRESPONDING MOTOR VEHICLE

(75) Inventors: Klaus Steinhauser, Kressbronn (DE); Frank Worms, Langenargen (DE); Stephane Klein, Friedrichshafen (DE); Walter Hecht, Ravensburg (DE); Bernd Zaenglein, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 566 days.

(21) Appl. No.: 12/671,949

(22) PCT Filed: Jul. 28, 2008

(86) PCT No.: PCT/EP2008/059860
§ 371 (c)(1),
(2), (4) Date: Dec. 8, 2010

(87) PCT Pub. No.: WO2009/027163
PCT Pub. Date: Mar. 5, 2009

(65) Prior Publication Data
US 2011/0087386 A1    Apr. 14, 2011

(30) Foreign Application Priority Data
Aug. 30, 2007 (DE) .......................... 10 2007 040 904

(51) Int. Cl.
*G06F 19/00* (2011.01)
(52) U.S. Cl.
USPC ................ 701/53; 477/102; 70/248; 180/337

(58) Field of Classification Search
USPC ............... 701/51, 53; 477/101, 102; 70/248, 70/247, 237, 245; 180/337
See application file for complete search history.

(56) References Cited

U.S. PATENT DOCUMENTS

| 3,937,105 | A | | 2/1976 | Arai et al. |
| 4,558,612 | A | | 12/1985 | Shimizu et al. |
| 4,892,014 | A | | 1/1990 | Morell et al. |
| 5,609,548 | A | * | 3/1997 | White et al. ................ 477/124 |
| 5,638,271 | A | * | 6/1997 | White et al. ................ 701/64 |
| 5,827,149 | A | * | 10/1998 | Sponable ................ 477/92 |

(Continued)

FOREIGN PATENT DOCUMENTS

| DE | 41 27 991 A1 | 2/1993 |
| DE | 100 37 576 A1 | 2/2002 |

(Continued)

*Primary Examiner* — Ronnie Mancho
(74) *Attorney, Agent, or Firm* — Davis & Bujold, PLLC

(57) ABSTRACT

A method for shifting an automatic or an automated transmission of a motor vehicle to a "neutral" position such that the shift position of the transmission and a parking lock, provided for keeping the motor vehicle stationary, are engaged as a function of a shift position selected with a driver operated selector device and as a function of other operating parameters of the motor vehicle. A holding phase, in which the transmission is in the neutral position, free from friction force locking, can be activated by a separate operating device which is provided, in addition to the selector device, but only when the motor vehicle is simultaneously at least approximately stationary, an ignition current circuit that acts on a drive engine of the motor vehicle is electrically interrupted, and the "neutral" (N) shift position is specified by a selector device.

36 Claims, 1 Drawing Sheet

(56) References Cited

U.S. PATENT DOCUMENTS

| | | | |
|---|---|---|---|
| 5,919,112 A * | 7/1999 | Michael et al. | 477/99 |
| 5,975,648 A * | 11/1999 | Rump | 303/3 |
| 6,213,911 B1 * | 4/2001 | Salecker et al. | 477/97 |
| 6,612,966 B2 * | 9/2003 | Fischer et al. | 477/93 |
| 6,699,155 B2 * | 3/2004 | Nagasaka | 477/94 |
| 6,702,405 B1 * | 3/2004 | Balz et al. | 303/192 |
| 6,802,574 B2 | 10/2004 | Ehrmaier et al. | |
| 7,204,785 B2 | 4/2007 | Berger et al. | |
| 7,530,921 B2 * | 5/2009 | Fackler et al. | 477/96 |
| 8,016,720 B2 * | 9/2011 | Sokoll | 477/95 |
| 8,128,530 B2 * | 3/2012 | Hecht et al. | 477/92 |
| 8,235,866 B2 * | 8/2012 | Steinhauser et al. | 477/96 |

FOREIGN PATENT DOCUMENTS

| | | |
|---|---|---|
| DE | 103 20 280 A1 | 11/2003 |
| EP | 0 814 287 A2 | 12/1997 |
| EP | 1 191 260 A2 | 3/2002 |
| JP | 2003-080967 A | 3/2003 |

* cited by examiner

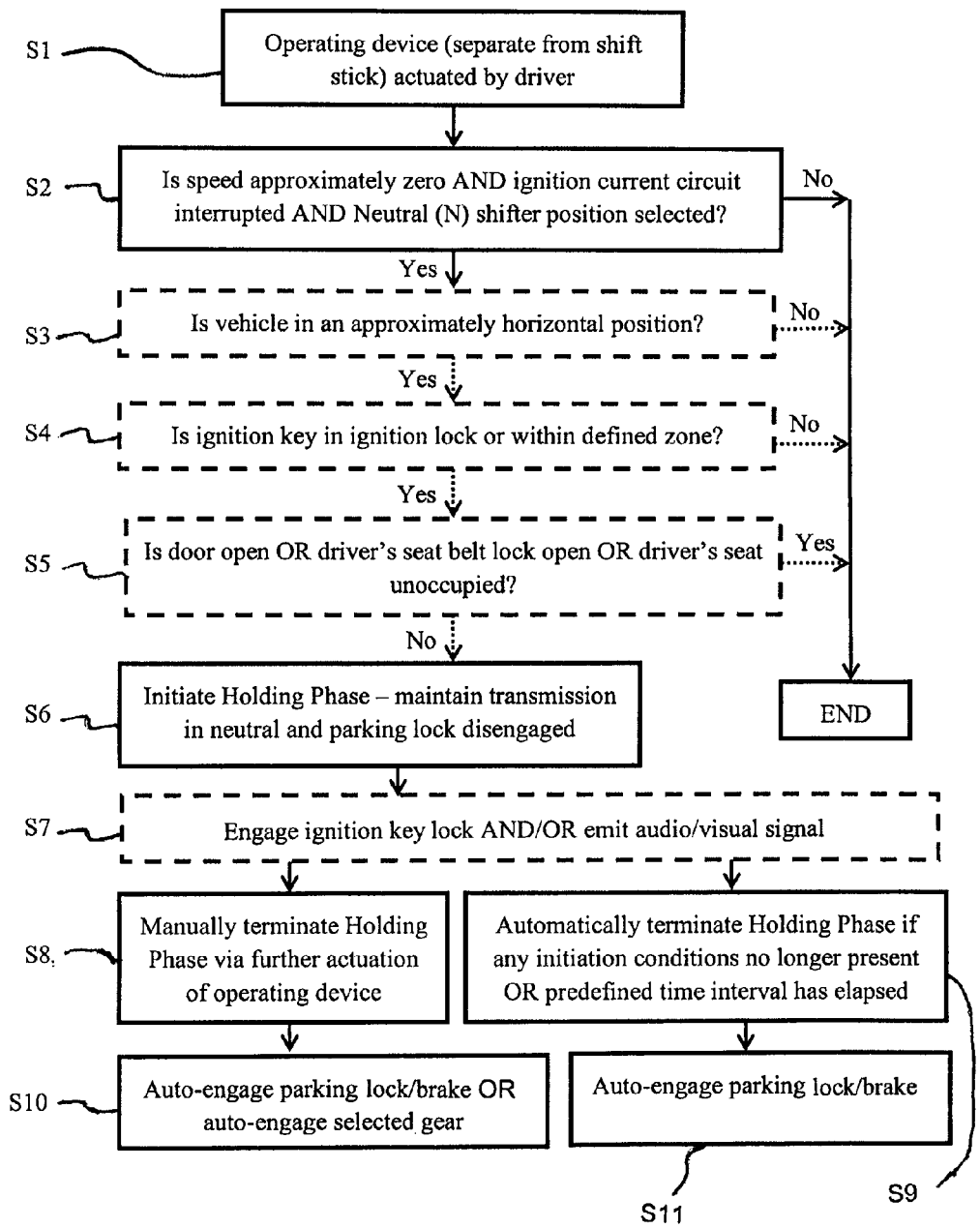

METHOD FOR ACTUATING THE NEUTRAL POSITION IN AN AUTOMATIC OR AUTOMATED TRANSMISSION OF A MOTOR VEHICLE, AND CORRESPONDING MOTOR VEHICLE

This application is a National Stage completion of PCT/EP2008/059860 filed Jul. 28, 2008, which claims priority from German patent application serial no. 10 2007 040 904.6 filed Aug. 30, 2007.

FIELD OF THE INVENTION

The invention concerns a method for shifting to the neutral position in an automatic or automated transmission of a motor vehicle, such that the shift position of the transmission and a parking lock, provided for keeping the motor vehicle stationary, can be engaged as a function of a shift position (P, R, N, D) selected with a selector device that can be operated by the driver of the motor vehicle and as a function of other operating parameters of the motor vehicle. In addition, the invention concerns a motor vehicle controlled by the method.

BACKGROUND OF THE INVENTION

Known automatic or automated motor vehicle transmissions, as a rule, comprise a parking lock by which a drive output shaft of the transmission can be mechanically locked. Besides a purely mechanical system for actuating a parking lock of that type by means of an active mechanical connection between a selector lever that can be operated by the driver in the interior space of the motor vehicle and the parking lock itself in the transmission, electro-mechanical and electro-hydraulic systems for actuating such a parking lock are also known—for example from DE 4127991 C2—, in which the parking lock in the transmission is connected, via an active electrical connection, to a selector device that can be operated by the driver inside the motor vehicle, and in which the parking lock can be actuated electro-mechanically or electro-hydraulically by a parking lock function implemented in an electronic control unit of the transmission as a function of a shift position selected with the selector device and as a function of other operating parameters of the motor vehicle.

Moreover various methods for the automatic engagement of such a parking lock are known. For example, in U.S. Pat. No. 3,937,105 it is proposed to engage the parking lock of the transmission automatically, independently of the shift position selected by the driver if an ignition current circuit of the motor vehicle is interrupted and at the same time the motor vehicle is still rolling at a speed lower than a defined low threshold value.

From U.S. Pat. No. 4,892,014 a method is known, in which the parking lock of the transmission is engaged automatically by an electric motor, on the one hand if an ignition current circuit of the motor vehicle is interrupted and at the same time the vehicle's speed is lower than a defined low threshold value, and on the other hand also if the driver's door of the motor vehicle is open and the driving seat of the motor vehicle is unoccupied and at the same time the speed of the vehicle is less than the low threshold value. In both cases, when the parking lock is automatically engaged a parking brake of the motor vehicle is also actuated automatically. In U.S. Pat. No. 4,892,014 it is also proposed that when the ignition current circuit is closed but the drive engine of the motor vehicle is not running, the transmission is automatically shifted by an electric motor to its neutral position without this having been called for by the driver.

Finally, from EP 0 814 287 B1 a function for the automatic engagement of the parking lock for an automatic transmission is known, in which the parking lock in the automatic transmission is engaged automatically by the transmission control unit, if the driving speed of the motor vehicle is zero and, an ignition current circuit has been interrupted and at the same time, as a further condition, either a predetermined time interval has lapsed since the ignition current circuit was interrupted or a vehicle door is open, but at the latest—and this as the sole condition—if the ignition key has been removed from the ignition lock. To give better vehicle availability, as a special feature in all three cases the engagement of the parking lock is prevented, if the driver has selected the neutral shift position using the selector lever either immediately before, or within a predetermined time interval after the engine is switched off.

SUMMARY OF THE INVENTION

The purpose of the present invention is to indicate a method alternative to those of the prior art for shifting to the "neutral" position in an automatic or automated transmission of a motor vehicle, in which the shift position in the transmission and a parking lock provided in order to keep the motor vehicle stationary can be engaged as a function of a shift position selected with a selector device that can be operated by the driver of the motor vehicle and as a function of other operating parameters of the motor vehicle, and in which, in operating conditions in which automatic engagement of the parking lock as a result of recognized particular operating parameters of the motor vehicle can be provided for and/or engagement of the parking lock is possible by virtue of the system, the drivability of the motor vehicle or its ability to move are as great as possible.

The invention starts from a method for shifting to the neutral position in an automatic or automated transmission of a motor vehicle, such that the shift position of the transmission and a parking lock, provided to keep the motor vehicle stationary, can be engaged as a function of a shift position (P, R, N, D) selected using a selector device that can be operated by the driver of the motor vehicle and as a function of other operating parameters of the motor vehicle.

According to the invention it is proposed that by means of a separate operating device provided in addition to the selector device a holding phase can be activated, in which the transmission is in a neutral position free from any friction force locking. This holding phase, however, can only be activated when the motor vehicle is at least approximately at rest and at the same time an ignition current circuit that acts upon a drive engine of the motor vehicle is electrically interrupted, and at the same time a shift position "neutral" (N) is specified by means of a selector device.

The method according to the invention can for example be used to good effect if the driver has stopped the motor vehicle in front of a car-wash unit and has switched off the engine by interrupting the ignition current circuit that acts upon the engine, and in the transmission of the motor vehicle the parking lock would be engaged automatically without additional measures by virtue of the system—for example because there is no longer an oil pressure in the transmission since the oil pump is now static.

Thanks to the method according to the invention it is now possible for the driver, using simple operating means, to deliberately and quickly bring the motor vehicle to an operating condition in which, even though the engine is static, the motor vehicle can roll provided that the shift position "neutral" (N) has previously been specified. In contrast, if a shift position other than "neutral" (N) has been specified by means of the selector device, for example the shift position "park" (P), "reverse" (R) or "forward drive" (D), then, for the sake of safety, the holding phase, in which the transmission in the neutral position free from friction force locking, is generally not activated.

In this context additional criteria or initiation conditions can also be provided, which also have to be fulfilled in order to be able to activate the holding phase in which the transmission is in the neutral position, free from friction force locking. For example it can be provided that in addition to the three initiation conditions already mentioned, namely "motor vehicle is at least approximately stationary", "ignition current circuit acting on the engine is electrically interrupted" and "shift position neutral (N) is selected", which all have to be fulfilled at the same time in order to be able to activate the holding phase, in which the transmission is in the neutral position free from any friction force locking, by means of the separate operating device, a further condition "vehicle is at least approximately in a horizontal position" must also be fulfilled at the same time in order to be able to activate the holding phase.

For example, it can also be provided that in addition to the three initiation conditions already mentioned, namely "motor vehicle is at least approximately stationary", "ignition current circuit acting on the engine is electrically interrupted" and "shift position neutral (N) is selected", which all have to be fulfilled at the same time in order to be able to activate the holding phase, in which the transmission is in the neutral position free from any friction force locking, by means of the separate operating device, at the same time a further condition "ignition key has not been removed from the mechanical or electro-mechanical ignition lock associated with the ignition key, or is not outside a defined zone around an electronic ignition lock of the motor vehicle associated with the ignition key" must also be fulfilled in order to be able to activate the holding phase.

All the initiation criteria can be appropriately combined with one another. For example, it can be provided that the holding phase can only be activated, IF the motor vehicle is in an at least approximately horizontal position AND at the same time a measured actual speed of the motor vehicle is lower than a predefined low threshold value AND at the same time an ignition key has not been removed from the mechanical or electro-mechanical ignition lock associated with the ignition key, or is not outside a defined zone around an electronic ignition lock of the motor vehicle associated with the ignition key, AND at the same time the shift position "neutral" (N) has been selected by means of a selector device. In this case therefore, four individual functions each with its own function logic are combined by Boolean AND-operators into a complex overall function.

In addition or alternatively, it can also be provided that the holding phase can only be activated, if it is recognized that the driver does not wish to leave the motor vehicle or is not leaving it. This intention or action of the driver can be concluded, for example, if at least one or more of the following example criteria is fulfilled:
"a door of the motor vehicle is open",
"the driver's seat belt lock is open,"
"a driver's seat occupation recognition sensor indicates that the driver's seat is unoccupied,"
and it is then appropriate to link at least two of these criteria with one another by means of the "logical AND" operator.

The result of this logical linking of the individual functions by means of "logical AND" is to achieve a high level of vehicle availability along with a high safety level for the vehicle's occupants and for the surroundings against undesired rolling away of the motor vehicle.

To increase the security against inadvertent removal of the ignition key it can additionally be provided that when the holding phase is being activated and/or is active, at the same time an ignition key block—also known as a so-termed "key lock"—is activated and/or active, which prevents the mechanical ignition key from being withdrawn from its mechanical or electro-mechanical ignition lock or the electronic ignition key—for example of the type of a so-termed "ID card"—from being taken too far away from its electronic ignition lock.

It is also appropriate, when the holding phase is being activated and/or is active, for an acoustic and/or visual indication to be triggered and/or emitted at the same time. This alerts the driver that he has carried out a manual action or that an action concerning the stationary status of the motor vehicle has been taken, and that the motor vehicle can consequently roll.

Regarding the deactivation of the previously deliberately activated holding phase in which the transmission is in the neutral position with no friction force lock, two variants are proposed. In the first of these two variants it is proposed that the previously activated holding phase can be deactivated manually by the driver using the aforesaid separate operating device.

In this case it is expedient, when the previously activated holding phase is terminated manually, to engage the parking lock automatically and/or to automatically actuate a vehicle parking brake regardless of the shift position selected by the selector device, and this in particular when the driver is not in the motor vehicle. Alternatively, it can be provided that when the previously activated holding phase is terminated manually, the shift position selected using the selector device is automatically engaged in the transmission provided this is possible by virtue of the system.

In the second variant it is proposed that the previously activated holding phase in which the transmission is in the neutral position free from friction force locking, can be deactivated automatically. Important aspects of this are the operational safety of the system and its security against failure.

Accordingly, to increase safety when operating parameters vary, it is proposed that the previously activated holding phase is terminated automatically, if the actual speed of the motor vehicle is higher than a predefined speed threshold. This ensures that the motor vehicle can only roll within specified limits. The predefined speed threshold can even be higher than the predefined low vehicle speed threshold value that must not be exceeded when the holding phase is activated.

To increase safety when operating parameters vary, it can also be provided that the previously activated holding phase is automatically terminated, if the motor vehicle is not in at least an approximately horizontal position.

To increase security against the driver's inattention or misuse, it is proposed that the previously activated holding phase is automatically terminated, if the ignition key has been removed from its mechanical or electro-mechanical ignition lock or is outside a defined zone around its electronic ignition lock.

To increase security against driver inattention it can also be provided that the previously activated holding phase is automatically terminated if it is detected that the driver wishes to leave or is leaving the motor vehicle. As already mentioned earlier, this intention or action of the driver can be concluded, for example, if at least one or more of the following example criteria is fulfilled:
"a door of the motor vehicle is open", "the driver's seat belt lock is open,"

"a driver's seat occupation recognition sensor indicates that the driver's seat is unoccupied".

To increase the security against driver inattention, it can also be provided that the previously activated holding phase is automatically terminated when a predefined time interval has lapsed. This function also has the major advantage that the motor vehicle's on-board electrical system will not be overloaded by the method according to the invention. In this connection reference can be made to customary transmission designs with an electro-hydraulically actuated parking lock system, in which the parking lock is disengaged by means of hydraulic pressure, is held in the disengaged condition by an electrically energized electromagnet, and is engaged by spring force in the absence of hydraulic pressure and when the electromagnet is switched off. Particularly in combination with a transmission of that type this proposed, comparatively simple functional extension can prevent the vehicle's battery from becoming overly discharged due to the electric load, in particular of the transmission control unit. The time interval expediently begins when the command to actuate the holding phase is recognized or, at the latest, when the transmission is also actually in the neutral position.

A still more efficient way to protect the vehicle's battery against excessive discharge is to monitor the current electrical charge status or the current electrical voltage of the vehicle's battery. Correspondingly, in a further variant it is proposed that the previously activated holding phase is automatically terminated, if the current charging status and/or the current electrical voltage of an electrical energy source of the motor vehicle provided in order to supply a control unit of the transmission and/or for starting the drive engine, has fallen to a value below a predefined discharge threshold.

The most efficient way to protect the vehicle's battery against excessive discharge is to monitor the amount of energy that has been drawn from the vehicle's battery or the electrical energy source provided for supplying the transmission control unit and/or for starting the engine—in particular by the transmission control unit—in the context of the function according to the invention. The amount of energy can for example be determined comparatively simply by computer means, by integrating the actual current power uptake by the transmission control unit over time, or by integrating the mathematical product of the actual current operating voltage and the actual current uptake of the transmission control unit over time. Correspondingly, in a further variant it is proposed that the previously activated holding phase is terminated automatically, if the amount of energy drawn in the context of the function according to the invention from the vehicle's battery or the electrical energy source of the motor vehicle provided for supplying the transmission control unit and/or for starting the engine, has reached or exceeded a predefined threshold value.

Furthermore, for safety reasons it is proposed that whenever a previously activated holding phase has been terminated automatically, the parking lock is automatically engaged and/or a parking brake of the vehicle is actuated automatically, regardless of the shift position selected by a selector device. This reliably prevents the transmission from being put inadvertently in a shift position that would lead to immediate force locking in the transmission when the engine is started.

If needs be, a person with knowledge of the subject will be able to appropriately combine the proposed provisions for automatically deactivating the holding phase, both with one another and if necessary also with the provisions for manual deactivation of the holding phase.

To increase comfort further, in a further development of the invention it is proposed that by means of the separate operating device provided for activating the holding phase, other aggregates too of the motor vehicle can be actuated. For example it can be provided that by means of the separate operating device, at the same time as or at a time proximal to the activation of the holding phase a command is also issued to close a sliding roof operated by an electric motor, or a folding or tilting cover operated by electric motor or electro-hydraulically, and/or windows of the motor vehicle operated by electric motors.

BRIEF DESCRIPTION OF THE DRAWING

The invention will now be described by way of example with reference to the accompanying drawing which is a diagrammatic representation depicting the method according to the present invention.

DETAILED DESCRIPTION OF THE PREFERRED EMBODIMENTS

Below, some further features of the method according to the invention are described in more detail, these relating to particular designs of the separate operating device provided at least for actuating the holding phase with the transmission in a neutral position free from friction force locking.

For example, the separating operating device for activating and deactivating the holding phase can be in the form of a switch operated by the driver. Correspondingly, the holding phase in which the transmission is in a neutral position free from friction force locking can be activated and/or deactivated when the driver operates the switch manually. The structure of such a switch and its position in the interior of the motor vehicle can be as desired and are at the discretion of those engaged in the field. An example embodiment of this is an electro-mechanical switch integrated in the ignition lock, for example in such manner that the holding phase is actuated when the ignition current circuit is electrically interrupted by means of the ignition lock. As another example embodiment, an electro-mechanical switch formed as part of the selector device or integrated therein can be mentioned.

However, it can also be provided for example that the separate operating device for activating and deactivating the holding phase is in the form of a remotely operated switch that can be actuated from outside the motor vehicle. Correspondingly the holding phase, in which the transmission is in a neutral position free from force-locking, can be activated and/or deactivated by actuating this remotely operated switch from outside the motor vehicle. Systems particularly to be considered in this context are ones with a transmitter (static or mobile) outside the vehicle, in order to be able to influence the maneuverability of the motor vehicle selectively from outside it, for example a transmitter at the entrance to a car-wash unit or a transmitter in a workshop.

Furthermore, it can also be provided for example that the separate operating device for activating and deactivating the holding phase is in the form of a sensor, which evaluates signals from the surroundings of the motor vehicle. Correspondingly then, the holding phase in which the transmission is in neutral and free from force-locking, can be activated and/or deactivated by the sensor. In particular image recognition sensors can be considered, with which for example sign-boards or the entrance of a car-wash unit or a road bridge can be appropriately recognized in the sense of pattern recognition for predefined ambient conditions in which the shift position selected by the selector device does not necessarily determine the highest priority for which shift position is actually engaged in the transmission.

If necessary, those with knowledge of the field can create appropriate combinations of the three switch variants "driver-operated switch", "remotely operated switch" and "sensor" mentioned.

In principle, the method according to the invention is suitable for the control of a parking lock having any structure. Usually, the parking lock of an automatic or automated transmission is integrated in the transmission itself. Usually also, in known transmissions mechanical, hydraulic, pneumatic, electric, hydraulic-mechanical, pneumatic-mechanical, electro-mechanical, electro-hydraulic or electro-pneumatic control systems for the parking lock are integrated in the transmission or arranged directly on the outside of the transmission. In a parking lock actuation system that operates electro-mechanically, electro-hydraulically or electro-pneumatically the actuator that acts upon the parking lock is usually controlled by a transmission control unit. In such a case it is expedient to integrate in the transmission control unit all the control functions required for implementing the commands to activate and then deactivate again the holding phase according to the invention with the transmission in a neutral position free from force-locking, so that the transmission control unit initiates the engagement of the neutral position in the transmission when the holding phase is activated, and engagement of the parking lock in the transmission and/or the actuation of the parking brake of the vehicle when the holding phase according to the invention is deactivated.

In principle, however, a separate control unit can also be provided for this, which then communicates in a separate manner with the transmission and its transmission control unit. In any case switchable communication must exist between the separate operating device and the transmission or its control unit. For example, it can be provided that the engagement of the neutral position in the transmission when the holding phase is actuated and the engagement of the parking lock in the transmission and/or the actuation of the vehicle's parking brake when the holding phase is deactivated, are initiated by a control unit of the separate operating device of the motor vehicle.

In principle the method according to the invention is also suitable for the control of a parking brake of any design. Usually, a parking brake is an integral part of the vehicle's service brake system and can be operated mechanically or electro-hydraulically by the driver and also controlled by a brake control unit if present. However self-sufficient systems, i.e. ones independent of the service brakes of the motor vehicle are also known. In combination with the control of a parking brake of the vehicle in the context of the invention, appropriate communication is always necessary between the separate operating device and the two other components involved, namely the "parking brake and transmission or brake system and transmission control unit".

The motor vehicle according to the invention comprises an automatic or automated transmission, a selector device that can be operated by the driver to specify a shift position (P, R, N, D) of the transmission, a parking lock in the transmission and/or a parking brake in the vehicle, a control unit for controlling the transmission and/or the parking brake as a function of other operating parameters of the motor vehicle, and an additional, separate operating device for initiating a holding phase in which the transmission is in a neutral position free from friction force locking, and is controlled by the method according to the invention described above.

As shown in the sole FIGURE, during a first step S1, the driver attempts to initiate a holding phase by actuating an operating device that is in addition to the shift stick. During a second step S2, the method queries if the vehicle's speed is approximately zero, the ignition current circuit is interrupted, and the gear shifter is in the neutral (N) position. If each of these three pre-conditions is present, a holding phase is initiated during a sixth step S6. During the holding phase, the transmission is maintained in a neutral friction-free state with the parking lock disengaged. If any of the three pre-conditions is not present, the method ends.

According to alternative embodiments, additional pre-conditions to initiating the holding phase are that the vehicle is in an approximately horizontal, as indicated by step S3, and the ignition key is either in the ignition lock or within a defined zone around the ignition lock, as indicated by step S4. Additionally, another pre-condition can be that the driver is within the vehicle. This can be verified by querying if the door is open, if the driver's seat belt lock is open, or if the driver's seat is unoccupied, as indicated by step S5.

Once the holding phase is initiated, optionally during a seventh step S7, an ignition key lock can be engaged to prevent the key from removal and/or an audio or video signal can be emitted by the automobile to alert the driver that the holding phase is active.

The holding phase may be terminated either manually, as indicated by step S8, or automatically, as indicated by step S9. To manually terminate the holding phase, the operating device can be actuated by the driver. Following manual termination of the holding phase, during a tenth step S10, the parking lock or parking brake is automatically engaged and/or the gear selected by the selector shaft is automatically engaged.

Alternatively, the holding phase can be automatically terminated during a ninth step S9, if any of the pre-conditions are no longer present or if a predefined time interval has elapsed. Upon automatic termination, during an eleventh step S11, the parking lock or parking brake is automatically engaged for safety.

The invention claimed is:

1. A method of shifting either an automatic or an automated transmission of a motor vehicle to a neutral position such that a shift position of the transmission and a parking lock, which restrains movement of the motor vehicle, are engaged as a function of a shift position (P, R, N, D) of a selector device operated by a driver of the motor vehicle and as a function of other operating parameters of the motor vehicle, the method comprising the steps of:

activating a holding phase, in which the transmission is in a neutral position free from friction force locking, by a separate operating device which is provided in addition to the selector device only when, substantially simultaneously, each of:

the motor vehicle is at least approximately stationary;

an ignition current that functions on a drive engine of the motor vehicle is electrically interrupted; and the selector device is shifted to a "neutral" shift position (N).

2. The method according to claim 1, further comprising the step of initiating, with a control unit of the separate operating device of the motor vehicle, at least one of:

when the holding phase is activated, engagement of the neutral position in the transmission; and when the holding phase is deactivated, engagement of the parking lock in the transmission; and when the holding phase is deactivated, engagement of a vehicle parking brake.

3. The method according to claim 1, further comprising the step of only activating the holding phase when the motor vehicle is in an at least approximately horizontal position.

4. The method according to claim 1, further comprising the step of only activating the holding phase if an ignition key either has not been removed from an associated one of a mechanical or an electro-mechanical ignition lock or is not outside a defined zone around an electronic ignition lock of the motor vehicle which is associated with the ignition key.

5. The method according to claim 1, further comprising the step of only activating the holding phase when the method determines that either the driver wishes to leave or is leaving the motor vehicle.

6. The method according to claim 1, further comprising the step of only activating the holding phase if a measured current speed of the motor vehicle is lower than a predefined low threshold value.

7. The method according to claim 1, further comprising the step of manually deactivating a previously activated holding phase, via the separate operating device employed by the driver for such purpose.

8. The method according to claim 1, further comprising the step of, when a previously activated holding phase is terminated manually by the driver, particularly if the driver is not in the motor vehicle, automatically engaging at least one of the parking lock and a parking brake of the vehicle regardless of the shift position of the selector device.

9. The method according to claim 1, further comprising the step of, when a previously activated holding phase is terminated manually, engaging the shift position of the transmission that is selected with the selector device such engagement is possible by virtue of a motor vehicle system.

10. The method according to claim 1, further comprising the step of automatically deactivating a previously activated holding phase.

11. The method according to claim 10, further comprising the step of automatically deactivating a previously activated holding phase, if an ignition key is either removed from an associated one of a mechanical or an electro-mechanical ignition lock or is outside a defined zone around an electronic ignition lock that is associated with the ignition key.

12. The method according to claim 10, further comprising the step of, when a current speed of the motor vehicle is higher than a predefined threshold value, automatically deactivating the previously activated holding phase.

13. The method according to claim 12, further comprising the step of, when activating the holding phase, defining the predefined speed threshold as being higher than a low speed threshold value that must not be exceeded.

14. The method according to claim 10, further comprising the step of, if the motor vehicle is not in an at least approximately horizontal position, automatically deactivating the previously activated holding phase.

15. The method according to claim 10, further comprising the step of, if the method detects that the driver either wishes to leave or has left the motor vehicle, automatically deactivating the previously activated holding phase.

16. The method according to claim 10, further comprising the step of, when a predefined time interval has lapsed, automatically deactivating the previously activated holding phase.

17. The method according to claim 10, further comprising the step of, if at least one of a current charge condition and a current electrical voltage of an electrical energy source of the motor vehicle, which is provided for at least one of supplying a control unit of the transmission and starting the engine, falls to a value below a predefined discharge threshold, automatically deactivating the previously activated holding phase.

18. The method according to claim 10, further comprising the step of, if an amount of energy drawn, for the method, from an electrical energy source of the motor vehicle which is provided for at least one of supplying a transmission control unit and for starting the engine, has either reached or exceeded a predefined threshold value, automatically deactivating the previously activated holding phase.

19. The method according to claim 18, further comprising the step of determining the amount of energy drawn by a mathematical integration of either an actual current uptake of the control unit over time or a product of an actual operating voltage and the actual current uptake of the control unit over time.

20. The method according to claim 10, further comprising the step of, when the previously activated holding phase is automatically deactivated, automatically engaging at least one of the parking lock and a parking brake of the vehicle regardless of the selected shift position of the selector device.

21. The method according to claim 1, further comprising the step of actuating at least one other aggregate of the motor vehicle by the separate operating device provided for activating the holding phase.

22. The method according to claim 21, further comprising the step of issuing a command signal, substantially simultaneously with the activation of the holding phase, to close at least one of:
an electrically actuated sliding roof;
an electrically driven or an electro-hydraulically actuated folding or tilting cover; and
electrically actuated windows of the motor vehicle.

23. The method according to claim 1, further comprising the step of at least one of activating and deactivating the holding phase by manual operation of a switch by the driver.

24. The method according to claim 23, further comprising the step of, if an ignition current circuit is electrically interrupted by an ignition lock, with the switch for at least one of activating and deactivating the holding phase being integrated in the ignition lock, activating the holding phase.

25. The method according to claim 1, further comprising the step of at least one of activating and deactivating the holding phase by operating a remote-controlled switch from outside the motor vehicle.

26. The method according to claim 1, further comprising the step of at least one of activating and deactivating the holding phase by a sensor that evaluates signals from a surrounding of the motor vehicle.

27. The method according to claim 1, further comprising the step of when the holding phase one of is and has been activated, at the same time an ignition lock block (key lock) one of is and has been activated, which prevents the mechanical ignition key from being removed from its mechanical or electro-mechanical ignition lock, or the electronic ignition key (ID card) from being taken too far away from its electronic ignition lock.

28. The method according to claim 1, further comprising the step of, when the holding phase either has been or is activated, at least one of triggering and emitting at least one of an acoustic and a visual indication.

29. The method according to claim 5, further comprising the step of when at least one of:
a driver door of the motor vehicle is open;
a driver seat belt is disengaged; and
a driver seat occupation sensor indicates that the driver seat is unoccupied determining that the driver either wishes to leave or is leaving the motor vehicle.

30. The method according to claim 1, further comprising the step of initiating, with a transmission control unit, at least one of:
when the holding phase is activated, engaging the neutral position in the transmission;
when the holding phase is deactivated, engaging the parking lock in the transmission; and
when the holding phase is deactivated, activating a vehicle parking brake.

31. A motor vehicle with either an automatic or an automated transmission, the vehicle comprising:
a selector device that is driver operated to specify a shift position (P, R, N, D) of the transmission;
at least one of a parking lock in the transmission and a parking brake in the vehicle;
a control unit for controlling the transmission and the parking brake as a function of a shift position (P, R, N, D) of the selector device and as a function of other operating parameters of the motor vehicle;
an additional separate operating device for activating a holding phase in which the transmission is shifted to a neutral shift position, free from friction force locking, and the method comprising the steps of:
activating the holding phase, in which the transmission is in a neutral position, free from friction force locking, by the separate operating device which is provided in addition to the selector device only when, substantially simultaneously, each of:
the motor vehicle is at least approximately stationary;
an ignition current that functions on a drive engine of the motor vehicle is electrically interrupted; and
the selector device is shifted to a "neutral" shift position (N).

32. The motor vehicle according to claim 31, wherein the separate operating device for activating and deactivating the holding phase is a switch that can be operated by the driver.

33. The motor vehicle according to claim 32, wherein the switch for activating and deactivating the holding phase is integrated in the ignition lock.

34. The motor vehicle according to claim 32, wherein the switch is one of formed as part of and integrated in the selector device.

35. The motor vehicle according to claim 31, wherein the separate operating device, for activating and deactivating the holding phase, is a remotely operated switch which can be actuated from outside the motor vehicle.

36. The motor vehicle according to claim 31, wherein the separate operating device, for activating and deactivating the holding phase, is a sensor which evaluates signals from a surrounding of the motor vehicle.

* * * * *